United States Patent [19]
White

[11] Patent Number: 6,049,506
[45] Date of Patent: Apr. 11, 2000

[54] OPTICAL FIBER SAGNAC INTERFEROMETER WHICH IDENTIFIES HARMONICALLY RELATED NULLS IN THE DETECTED SPECTRUM

[75] Inventor: Ian Arthur White, Dunwoody, Ga.

[73] Assignee: Lucent Technology Inc., Murray Hill, N.J.

[21] Appl. No.: 09/240,735

[22] Filed: Jan. 29, 1999

[51] Int. Cl.[7] .................................................. G01B 9/02
[52] U.S. Cl. ...................... 365/345; 250/227.19; 385/12
[58] Field of Search .................... 356/345, 350, 356/73.1; 250/227.19, 227.27; 385/12, 14

[56] References Cited

U.S. PATENT DOCUMENTS

| | | | |
|---|---|---|---|
| 4,787,741 | 11/1988 | Udd | 356/345 |
| 4,853,534 | 8/1989 | Dakin | 250/227.19 |
| 4,898,468 | 2/1990 | Udd . | |
| 4,903,050 | 2/1990 | Dunn et al. . | |
| 4,976,507 | 12/1990 | Udd . | |
| 5,046,848 | 9/1991 | Udd . | |
| 5,355,208 | 10/1994 | Crawford et al. . | |

OTHER PUBLICATIONS

J. P. Dakin, et al., "A Novel Distributed Optical Fibre Sensing System Enabling Location Of Disturbances In A Sagnac Loop Interferometer," SPIE Vol, 838 Fiber Optic and Laser Sensors V, 1987, pp. 325–328.
E. Udd, ed., "Light Sources," Fiber Optic Sensors, 46–47, § 3.3, 1991.
K. Y. Chen, et al., "Integrated Communication And Sensing System Using One Single–Mode Optical Fibre," Electronics Letters, vol. 24, No. 13, 790–793, Jun. 1988.

*Primary Examiner*—Samuel A. Turner
*Attorney, Agent, or Firm*—Michael A. Morra

[57] ABSTRACT

An optical fiber sensing system (20) applies spectral analysis to time-varying disturbances in the output optical power from a Sagnac interferometer. In particular, harmonically related null frequencies in the spectrum (402) of the output optical power from the Sagnac interferometer are used to uniquely determine the location of a disturbance along a fiber cable (50). An optical signal having relatively high coherence is fed into a splitter (25), which creates a pair of subsignals that are sent in opposite directions around a common optical path. The splitter is effective to recombine the subsignals after they have traveled around the common path. The location of the disturbance is determined by the formula:

$$z = L - c/n_e(\pi/\Omega_0); \text{ where}$$

z is the distance between the locations of the disturbance and the splitter;

2L is the length of the common path;

c is the speed of light;

$n_e$ is the effective index of refraction of the optical fiber path experienced by the subsignals; and $\Omega_0$ is the fundamental frequency associated with harmonically related nulls in the spectrum.

Preferably, the sensing system is embedded within a communication system (60), which operates at wavelengths that are different than the wavelengths of the sensing system.

17 Claims, 4 Drawing Sheets

OPTICAL FIBER SAGNAC INTERFEROMETER WHICH IDENTIFIES HARMONICALLY RELATED NULLS IN THE DETECTED SPECTRUM

TECHNICAL FIELD

This invention relates to a method and apparatus for detecting disturbances in an optical transmission system and, more particularly, to an improved technique for locating disturbances in an optical fiber network.

BACKGROUND OF THE INVENTION

A well-known adage instructs us not to "put all of our eggs into one basket." The fear, of course, is that if the basket is dropped then everything will be lost. This is usually excellent advice; but when there are compelling reasons to the contrary, it may be wiser to put our eggs in one basket—and then watch that basket carefully. Such is the case with fiber optic transmission systems whose high-capacity and economy provide compelling reasons to consolidate a staggering number of voice, video and data circuits onto a single, hair-thin glass fiber. Nevertheless, should that glass fiber fail for one reason or another, then the consequences may also be staggering. Consider the number of customers who would be inconvenienced by a fiber failure, and consider the effect when medical, transportation and emergency communication services are disrupted.

Viewed from another perspective, fiber optic transmission systems, like all communication systems, are used to communicate highly confidential information. And while it was once thought that optical systems were immune from eavesdropping, scoundrels have risen to the challenge and are now able to extract data from a "lit" fiber without breaking the transmission path. The point is simply that it is even more important in optical fiber systems to be able to detect and quickly locate any intrusion or disruption to the transmission path.

A basic fiber optic intrusion detection system is described in U.S. Pat. No. 4,904,050 issued to Dunn et al. on Feb. 27, 1990 which discloses a closed loop of optical fiber in which a beam of light is split and caused to travel around the loop in opposite directions. The loop comprises an optical cable having a large number of fibers bundled together within a common sheath. At one end of the cable, a pair of fibers are connected to an interferometer; while at the other end of the cable these same fibers are joined together, end-to-end, thereby enabling lightwaves to travel from one fiber to the other. These beams are recombined in the interferometer after traversing the same loop in opposite directions and caused to fall on a detector in an interference pattern. Variations in the resulting signal from the detector are used to detect the existence of a disturbance. However, the actual location of the disturbance is unknown.

A paper entitled "A Novel Distributed Optical Fiber Sensing System Enabling Location of Disturbance in a Sagnac Loop Interferometer," *Proceedings of the SPIE*, Vol. 838 at page 325 (1987) describes a combination of Mach-Zehnder and Sagnac interferometers where, along a single fiber optic path, the Mach-Zehnder interferometer has direct detection sensitivity while the Sagnac interferometer has position dependent sensitivity. By forming a ratio between the position-dependent and position-independent signals, the location and magnitude of the disturbance may be determined. Unfortunately, these different interferometers individually achieve optimum performance under different conditions which are mutually exclusive, and so a fundamental incompatibility exists between these two interferometers which is undesirable.

U.S. Pat. No. 4,976,507 discloses a Sagnac Distributed Sensor that is capable of determining the location and severity of a disturbance along a fiber optic loop. This is accomplished by operating the sensor in two distinct modes, and then processing the measurements to electronically calculate the location of the disturbance. In the first mode, the interferometer is operated in the manner described in the preceding paragraph, and a relative phase shift is generated between the counter-propagating light waves that is dependent upon both the location and the severity of the disturbance. In the second mode, the lightwave traveling in one direction around the loop is shifted in wavelength prior to traversing the loop, whereas the lightwave traveling in the other direction around the loop is shifted in wavelength after traversing the loop. Wavelength shifting is accomplished by means of a relatively expensive discrete optical frequency shifter and associated control circuitry. Less expensive intrusion locating equipment would seem possible since severity information is not desired.

What is needed and what is not yet available is an optical fiber sensing system, which is low in cost and which provides accurate information regarding the location of any intrusion that may occur within the optical communication system.

SUMMARY OF THE INVENTION

All time varying signals comprise a spectrum of frequency components than can be represented by a Fourier series. The present invention takes advantage of this fact and applies it to time-varying disturbances in the output optical power from a Sagnac interferometer. Surprisingly, it was found that the harmonically related null frequencies in the spectrum of the output optical power from the Sagnac interferometer could be used to uniquely determine the location of a disturbance along a fiber cable.

In an illustrative embodiment of the invention, the optical fiber sensing system includes an optical splitter for splitting an incoming signal into two subsignals. A source having a relatively high degree of coherence, such as a laser, is connected to the splitter and provides the incoming optical signal to the splitter. The optical fiber sensing system includes an optical fiber path, which begins and ends at the splitter and which receives subsignals split from the incoming signal. The splitter causes the subsignals to be sent in opposite directions around a common path, which begins and ends at the splitter. Also, the splitter is effective to recombine the subsignals after they have traveled around the common path.

The location of a disturbance (intrusion) is illustratively determined according to the formula:

$$z = L - c/n_e(\pi/\Omega_0); \text{ where}$$

z is the distance between the locations of the disturbance and the splitter;

2L is the length of the common path;

c is the speed of light;

$n_e$ is the effective index of refraction of the optical fiber path experienced by the subsignals; and $\Omega_0$ is the fundamental frequency associated with harmonically related nulls in the spectrum.

In a preferred embodiment of the invention, the fiber optic sensing system is embedded within a communication system that operates at wavelengths, which are different than the wavelengths of the sensing system. Optical routers are used to route the wavelengths of the sensing system in such a manner that a closed loop is created within the communication system.

BRIEF DESCRIPTION OF THE DRAWING

Other objects and features of the present invention will be more readily understood from the following detailed description of specific embodiments thereof when read in conjunction with the accompanying drawings, in which.

DETAILED DESCRIPTION

Figure 1:
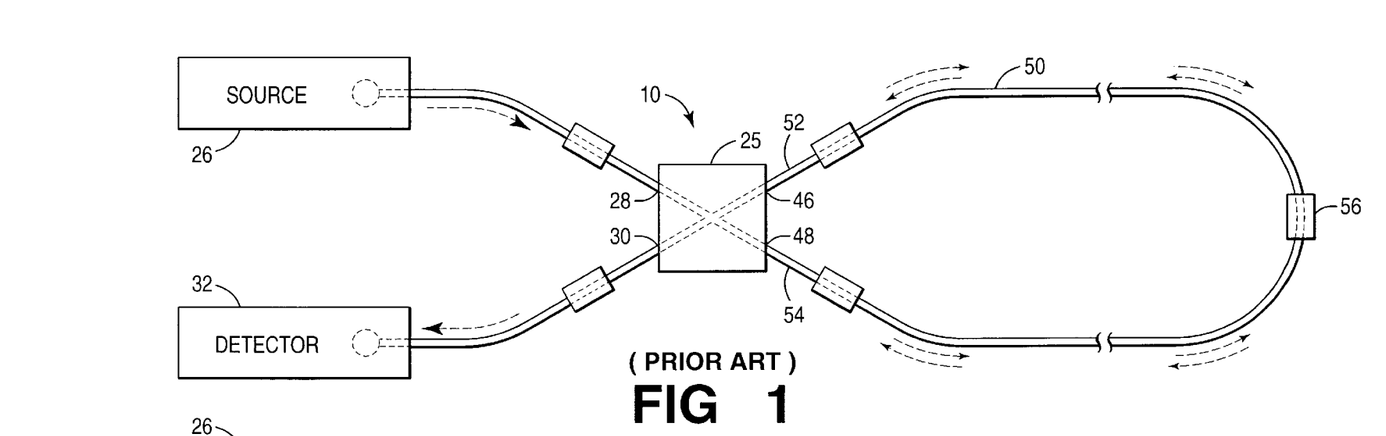
FIG. 1 is a schematic view of a known optical fiber sensing system.

FIG. 1 discloses a known optical fiber sensing system, which is designated generally by the numeral 10. This system is more completely described in U. S. Pat. No. 4,904,050 which is hereby incorporated by reference. Briefly, however, system 10 includes a four-port splitter 25 that is frequently referred to as a coupler. A source 26 of optical power is connected to a port 28 of the optical splitter 25.

Connected to a second port 30 of the splitter 25 is a detector 32. This detector is adapted to detect changes on the interferometric pattern of the system 10 when the optical fiber is handled. In addition to the above-mentioned ports, the splitter also includes third and fourth ports 46 and 48 that connect to an optical fiber loop 50. Illustratively, fiber loop 50 comprises a pair of optical fibers within a single cable that are abuttingly joined (end-to-end) at connector 56, although the loop 50 may comprise An incoming signal to the optical splitter 25, such as provided by the source 26, is split into two subsignals that are directed in different directions around the loop of optical fiber 50. The split signals travel in opposite directions along the common path and are recombined back at the splitter with associated constructive or destructive interference. Such interference is registered as a power change at the detector 32 which is attached to the port 30 of the optical splitter. The split as between the subsignals may be varied. A fifty-fifty split provides the most sensitive system wherein the interference ranges from 0 to 100%. A different split could be used if noise is a concern. Of course, should noise be a factor, detection facilities can be set to a higher level.

Stresses may be imparted to the optical fiber, either advertently or inadvertently, from a number of sources which may ultimately cause damage to the fiber. (The most notable source of concern being construction equipment.) Not only is it desirable to know when a cable is physically touched (e.g., by a backhoe), it is more desirable to know that construction equipment is operating in the area before the cable is touched. Such information can be used to determine in advance how to reroute communication traffic in the event that the cable is severed. Indeed, rerouting can be commenced even before the cable is damaged. The very act of handling a cable, for example, causes signal level changes in the range of 2–3 dB. Such sensitivity has a significant application in the detection of sound waves that propagate through the ground and cause minor stress variations in the optical fiber within a cable. Any stress imparted to the optical fiber 50 will change the phase relationship between the two oppositely traveling subsignals thereby changing the interference between them. This condition manifests itself as a power change from detector 32.

Thus far, only the existence of a disturbance has been discussed. The present invention provides a low cost continuous monitoring system for optical cable paths that can not only identify, but also locate, the source of potential cable damage, and/or intrusion into an optical network, before the path performance is affected. More specifically, the present invention is directed toward an optical communication system which includes a significantly improved sensing system therein. In this regard, the basis of the present invention is the concept that signals, such as the time-varying, output optical power from a Sagnac interferometer, can be described in terms of the frequency components of the signal through Fourier analysis of the detected signal. In particular, by performing a spectral analysis on the signal from the Sagnac interferometer, the harmonically related null frequencies in the spectrum of the signal are used to identify the location of a disturbance along the fiber cable. This analysis is illustratively performed by a processor 100 such as shown in FIG. 2.

Figure 2:
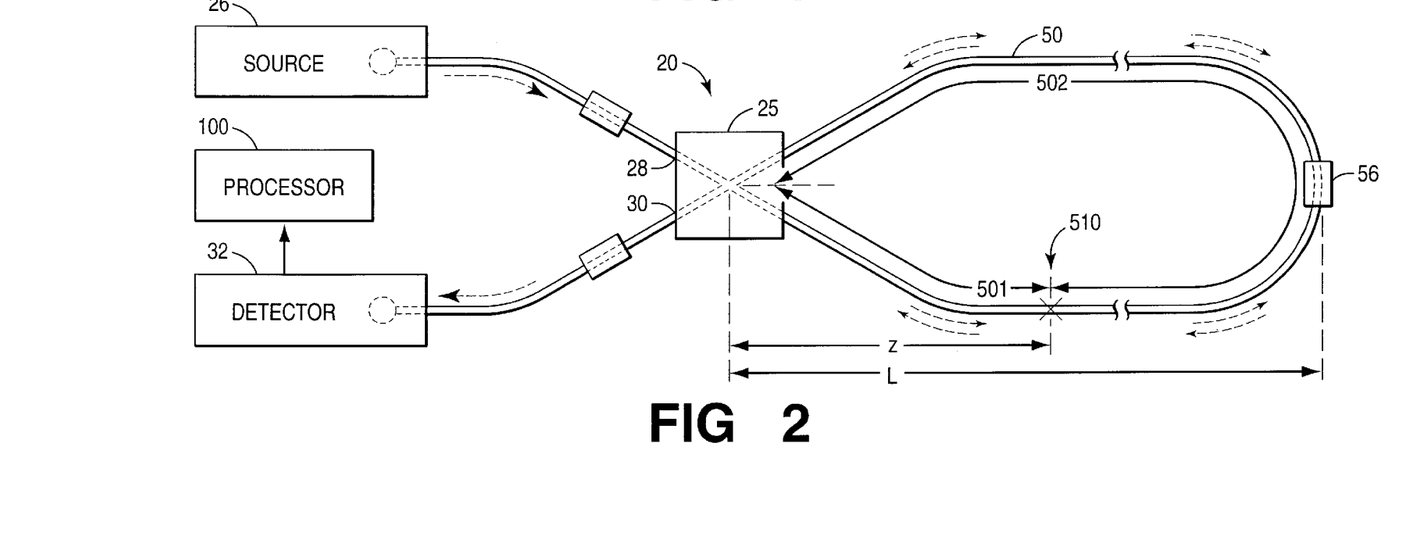
FIG. 2 is a schematic view of a optical fiber sensing system according to the present invention.

It will be observed that the present invention of FIG. 2 uses the above-described Sagnac interferometer of FIG. 1, but then analyzes the frequency content of the received light waves in an associated processor 100. Optical power source 26 preferably has a relatively high degree of coherence, i.e., greater than about 1 km coherence length, as defined at pages 46–47 of *Fiber Optic Sensors*, edited in 1991 by Eric Udd for Wiley Interscience. The narrower the range of operating wavelengths, the more sensitive the system 20. Desirably, the spectral bandwidth of the source is less than about 10 nanometers (nm).

In the present invention, a laser is preferred as the source 26 due to its relatively high degree of coherence; nevertheless, other sources of optical power having a lower degree of coherence may also be used. For example, a light-emitting diode (LED) also could be used to provide successive signals for the optical system. While, it is recognized that a light-emitting diode source generally has a spectral bandwidth wider than the preferred parameters set forth above, such sources are acceptable for use in a sensing system in accordance with the present invention. Due to the wider spectral bandwidth of an LED source, there will be less fluctuation in the detected signal resulting from the implementation of a sensing system in accordance with the present invention. Therefore, while an LED source may be used in accordance with the present invention, the sensitivity of the sensing system will be less than when a more coherent source is used.

The length of optical fiber 50 may comprise two optical fibers of a cable, for example, which are connected through a connector 56, or it may comprise a single length of optical fiber. In general, the total length of fiber path for implementing the present invention is dependent on at least the following factors: (i) the sensitivity, i.e., minimum detected signal at a set bit rate, of the detection system used preferably from about −10 dBm to −60 dBm; (ii) the input power level of the test signal, preferably from about +10 dBm to +30 dBm; (iii) the presence of any amplifiers on the output leg of the source; (iv) the particular sampling frequency targeted for the detection, 1 GHz for example; and (v) the type of fiber being employed.

The paths of the subsignals are reconnected at far ends of the paths at the splitter 25. The split signals travel in opposite directions along the common path and are recombined back at the splitter with associated constructive or destructive interference. The constructive or destructive interference is registered as a power change at detection system 32, which as stated earlier is attached to port 30 of the splitter. In other words, the changes in the phase relationship between the two propagating subsignals is manifested as a power level change in the detected signal wherein the minimum detected power level corresponds to the total destructive interference and the highest detected power corresponds to the total constructive interference.

Any time-varying stress imparted along the length of optical fiber 50 will change the phase relationship between the two oppositely traveling signals when they are recombined, thereby changing the interference between the two and registering a power change. As used herein, the term "phase relationship" refers to the relative phase difference at a particular position within the system of interest.

Overall, in the physical handling of a 5 km cable, for example, the detected signal level changes at detection system 32 of about 1 or more dB with typical responses of about 2–3 dB have been observed. Such a sensitive response has a significant application in the detection of an intrusion attempt on to the optical fiber. In fact, the magnitude of the signal changes due to cable handling alone may be sufficient to alert the system before any signal tapping occurs. Handling of a bare fiber or a bundle of fibers which includes the sensing fiber typically results in large responses, on the order of about 10 dB. Also, acoustic vibrations established by normal voice patterns are manifested as disturbances on the order of a 1 to 2 dB level because of the acute sensitivity of the optical fiber. As an example, given the above numbers, it may in fact be possible to detect and monitor people talking to each other around the sensing system, say in a central office, or detect traffic passing over a manhole near the sensing system.

Such a system as described above can be included easily in an existing optical fiber transmission system provided there are two spare optical fibers that can be used to form the common path loop. There may be instances however, when two fibers for sensing or monitoring use are not available. In those instances, wavelength-division multiplexing (hereinafter "WDM") techniques are used to introduce a signal (at a different wavelength) onto an optical fiber that is carrying normal traffic signals.

If there is a disturbance, i.e., a time-varying change in the stress experienced by a fiber in the loop, then the phase relationship between the counter-propagating pulses is changed, and constructive or destructive interference occurs that significantly changes the output of detection system 32. Such stress may occur in any handling of the cable or fiber. Advantageously, the system 20 is a distributed sensor that can be used to monitor an entire cable length between regenerators.

For the source 26 of optical power, a laser is preferred because of its narrow wavelength spectrum. With a single wavelength, intrusion causes the interference pattern to change from constructive to destructive, resulting in a significant dB loss. On the other hand, for a light-emitting diode, there is a wide range of wavelengths, and disturbances may cause a change of only about 10 percent in the normal power levels, that is less than about 0.5 dB, so that an intrusion is not as noticeable.

The optical fiber sensing system of this invention has several important advantages. First, the sensitivity is such that such a system need not be associated with each optical fiber in a cable. One fiber in a cable is sufficient for this purpose and will provide an alarm. In fact, the arrangement is so sensitive that a mere touching of the cable stresses the sensing fiber sufficiently to activate an alarm signal, if so desired.

Secondly, the optical fiber sensing system has been shown to perform as intended over relatively long distances. For example, a loop with a total length of sixty kilometers provides detection capabilities over a linear distance of thirty kilometers. Or, a sixty kilometer linear span may be protected by two, thirty kilometer loops, one beginning from each end of the distance span. This is an example distance and is not a limitation of the system.

Figure 3:
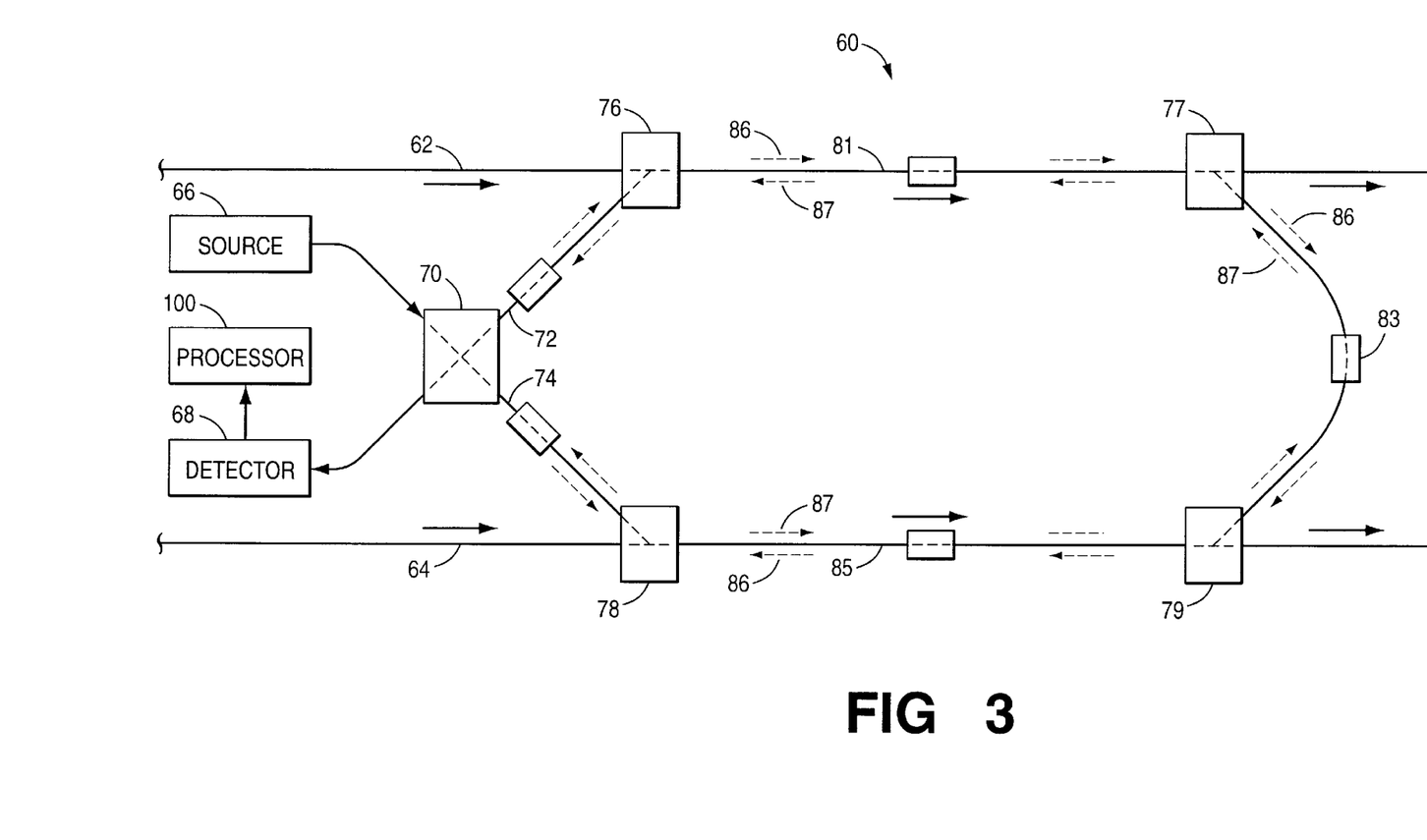
FIG. 3 is a schematic view of a preferred embodiment of an optical fiber sensing system, which is embedded within a communications network.

A system which uses WDM techniques is shown, for example, in FIG. 3 and is designated generally by the numeral 60. As is shown, the system 60 includes two normal traffic-carrying optical fibers 62 and 64. For detection of intrusion, the system 60 includes a source 66 and a detector 68, each of which is connected to a splitter 70 such as that used in the arrangement of FIG. 2. Even though it may be possible to tap off power from a source used for other purposes, in practice, a separate source for the sensing system is preferred to avoid interference and/or signal loss caused by the tapping of power.

The splitter 70 splits an optical signal incoming from the source 66 into two subsignals with one of the subsignals traveling initially along a loop portion 72 and another traveling initially along a loop portion 74. Used in this arrangement are optical signal routers, more particularly WDMs 76, 77, 78 and 79. WDM routers are well known in the industry and are commercially available from a number of suppliers. The signal which is split and sent in opposite directions along the portions of the intrusion detection loop is at a different wavelength than those signals used to carry normal traffic so as to not interfere with the transmitted signal on the communication path. Only those signals in a narrow band of operating wavelengths are split. However, it should be noted that in accordance with the present invention, various wavelength isolation techniques similar to those presently used when communication signals of different wavelengths are propagated down a common fiber, may also be used to allow a single fiber to be employed as a part of the sensing system as well as a carrier of normal communication traffic signals. Typically, such wavelength isolation is achieved by introducing a wave division multiplexer into the fiber to be used for dual purposes.

One split signal which is directed in a clockwise direction first through the WDM router 76, then along a loop portion 81 and through the WDM router 77, travels through a connector 83 and then through the WDM router 79, a loop portion 85 and through the WDM router 78 returning to the splitter 70 to be recombined. This signal is indicated in FIG. 3 by solid arrows 86—86. There, it is recombined with the split signal which had been directed in a counterclockwise direction as viewed in FIG. 3 sequentially through the WDM routers 78, 79, 77 and 76 and which is indicated in FIG. 3 by broken arrows 87—87.

The obvious advantage of this arrangement is that it does not require additional optical fibers over those which already carry traffic. As the intrusion detection system does not carry high bit rates, and because low bit rate detectors can detect signals down to a value less than −60 dBm, the total loss of the system around the loop could be 40–45 dB without loss of sensitivity.

Referring again to FIG. 2, a Sagnac interferometer is shown wherein a disturbance occurs at location 510, which is located at a distance "z" from the splitter 25. Distance "z" is used to represent the length of cable segment 501. Additionally the overall length of loop 50 is "2L," which comprises cable segments 501 and 502. A localized, time-varying disturbance imposed on the fiber at location 510 creates a phase disturbance in the signals of the optical path that is proportional to the magnitude of the disturbance. Such a phase change is created even by a disturbance that is imposed but then after imposition is not varied, for example a constant load applied rapidly. Furthermore, it should be understood that the proportionality referred to herein is not limited merely to linear proportionality. An optical pulse passing through the disturbed region of the fiber will experience additional changes in phase over and above the changes in phase experienced in an undisturbed fiber. This additional phase change is denoted herein as S(t) and illustratively shown in FIG. 4.

In a Sagnac interferometer, an initial optical pulse launched into the optical splitter at a time t=0, is split into two pulses that travel around the loop in opposite directions. Given a disturbance in a Sagnac interferometer of total length 2L at a distance z from the splitter, the two pulses experience the localized disturbance at different times with the time difference being designated herein as δt(z) where:

$$\delta t(z) = \frac{2(L-z)n_e}{c}$$

In the above equation, $n_e$ is the effective index of refraction of the optical fiber for wavelengths of the subsignals pulse, and c is the speed of light.

In general, the group pulse is related to the relative speed of the pulse in the optical fiber. For typical fibers $c/n_e$=200,000 km/sec. Based on these numbers, a pulse traveling in the above-described typical fiber takes about 5 microseconds to traverse one kilometer of fiber.

As a numerical example, consider a loop 100 km long (i.e., 2L=100 km). If a disturbance to the path occurs at a distance 10 km from the splitter in either direction, the two counter propagating pulses would experience the disturbance at times delayed by approximately 400 microseconds from each other for standard fibers. The phrase either direction as used above means in a single direction but it does not matter which direction it is. For convenience, the supporting mathematics is presented below.

$$\delta t(z) = \frac{2(L-z)n_e}{c} = \frac{2(50-10)}{200,000} = 400 \text{ microseconds}$$

After traversing the entire loop the two pulses are recombined through the splitter. If the fiber path is undisturbed everywhere else but at the location of the disturbance described above, the combining signals differ only by the different phases generated in the disturbed region caused by the delay above. One pulse suffers a phase distortion of $S(t_o)$ while the other pulse traveling in the opposite direction experiences $S(t_o+\delta t(z))$ with $t_o=z\, n_e/c$. In other words, even though the subsignals arrive at the splitter at the same time they do not necessarily have the same phase delay.

The phase difference between these two pulses when they recombine in the splitter is designated herein as $S_{tot}(t)$ where:

$$S_{tot}(t)=S(t_o)-S(t_o+\delta t(z))+\pi$$

The addition of π arises from the phase effects induced by the actions of the standard optical splitter when it splits and recombines the two signals. However, this does not imply that the size of the phase distortion is dependent on the time the distortion is encountered if the distortion is constant.

It is important to note that the type of distortions discussed above vary in time. However, if the distortion is constant in time, there will be no difference in phase between the two pulses apart from the splitter induced π. Additionally, this π phase difference between the interfering pulses remains constant in time indicating that the detected signal does not vary in time. On the other hand, if the disturbance is periodic in nature, so that the signal distortion repeats in magnitude after some period of time $t_1$, then should this period $t_1$ or integral multiples of this period coincide with the delay, δ(z), the two phase changes of the pulses are identical. As a result, the cumulative phase difference of the combining pulses is π at the output side of the splitter which results in destructive interference and a resultant zero output response of the loop, or at least a constant signal independent of time.

In the above 100 km loop example, any frequency components of the disturbance at the fundamental harmonic of 2500 Hz (or approximately 15700 radians per second) or multiples of this frequency would show no response in the output signal spectrum.

In general, disturbances experienced along the loop are not periodic. However, any time-varying disturbance can be described by a linear sum of its frequencies represented via a Fourier series or expansion. Such a set of frequencies is commonly referred to as the frequency spectrum of the distortion and depicts both the range of frequencies of a time-varying disturbance as well as the relative amplitude of each frequency present. Typically, the frequency spectrum of the detected signal from the loop will contain all frequencies of the disturbance imposed, except those frequencies identified above (2π/δt(z) radians per sec) as having no effect on the two counter propagating pulses. The amplitude value of the frequency spectrum at these non-effecting frequencies will be zero. Therefore, by detecting the output signal from the loop and examining its frequency spectrum, the set of zero amplitudes of the frequency spectrum can be directly related to the position along the loop at which a disturbance is generated. In other words, the Fourier components with zero amplitudes are indicative of the position of the distortion. However, it should be understood that while the frequency spectrum of the detected signal can be used to replicate the time-varying distortion, they are not identical.

The frequency components $[F_{tot}(\omega)]$ of the detected signal are determined by the Fourier series of $S_{tot}(t)$ wherein:

$$F_{tot}(\omega) = F(\omega) \cdot \left[1 - \exp\left(j\frac{2(L-z)n_e}{c}\right)\omega\right]$$

To mathematically express the concepts discussed immediately above, the following may be beneficial. The frequencies in the Fourier series are those of the original distortion, F(ω), except when $$\frac{2(L-z)n_e}{c}\omega = 2k\pi$$

$\omega=2k\pi$ where the output response at this frequency is zero. As a matter of completeness, it is noted that such occurs for a fundamental frequency, k=1, and all harmonics k=2, 3 . . . Based on these fundamentals, the present application teaches that the nulls in the frequency response of the detected signal can be used to directly pinpoint the location of the distortion.

Ascertaining the fundamental harmonic $\Omega_0$ then establishes the location of the disturbance as a result of the following formula:

$$z = L - c/n_e(\pi/\Omega_0)$$

However, for a more exact calculation, all of the identifiable nulls may be used with standard harmonic analysis techniques to identify the fundamental harmonic.

A loop of 100 km in length (L=50 km), which experiences a disturbance located 10 km from the splitter, all frequencies that were integral numbers of 2500 Hz in the frequency spectrum of the output signal from the loop would be zeros or null points. However, if the disturbance was shifted to a position 20 km from the splitter, then all integral multiples of 3333.333 Hz would be zero. Thus, the change in null frequencies with the position of the disturbance along the loop indicates the sensitivity to location. If null frequencies can be measured to an accuracy of 1 Hz then the location of the disturbance can be determined to an accuracy of approximately 1.5 meters.

Figure 4:
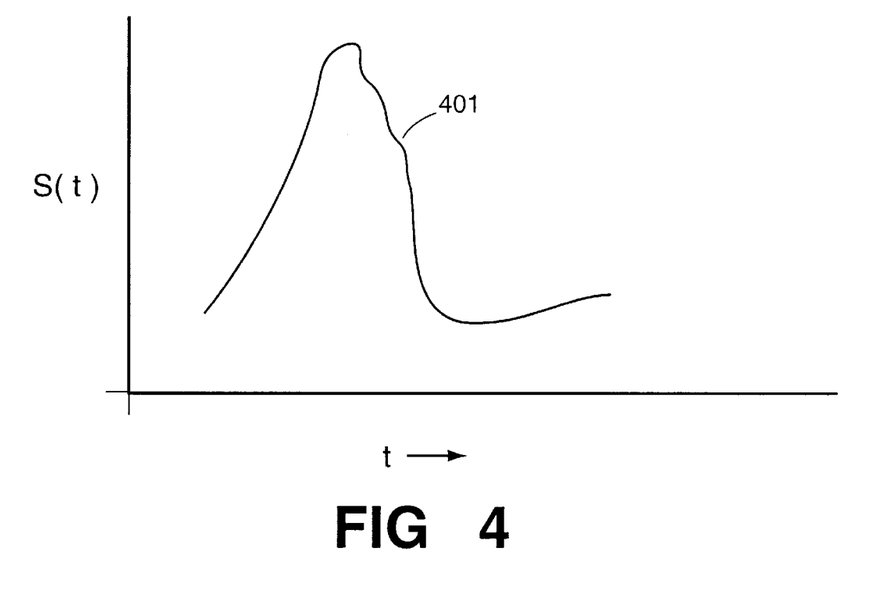
FIG. 4 shows a phase disturbance-versus-time plot experienced by optical signals traveling around the optical fiber sensing system of FIG. 2 when a disturbance occurs.
Figure 5:
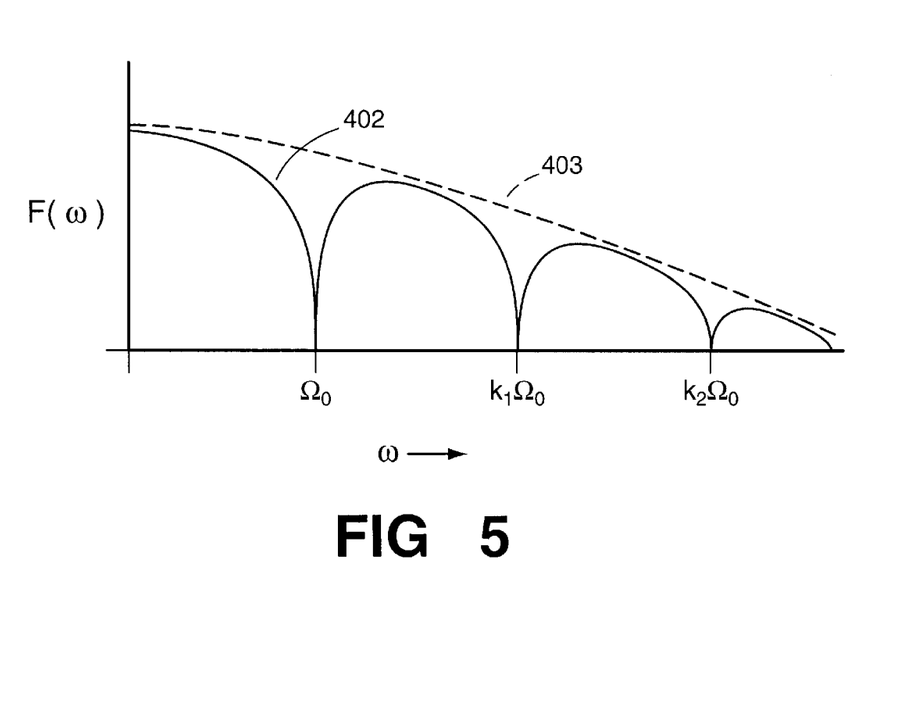
FIG. 5 is an amplitude-versus-frequency plot of the detected signal at an output of the optical fiber sensing system as a result of the phase disturbance shown in FIG. 4.

Reference is briefly made to FIG. 5 which shows amplitude-versus-frequency plot (i.e., a frequency spectrum) of the output power at the output of detector 32 (see FIG. 2) as a result of the phase disturbance shown in FIG. 4. By analyzing the harmonically related nulls ($\Omega_0$, $k_1\Omega_0$, $k_2\Omega_0$, . . . ), the distance of the disturbance from the splitter can be determined. As indicated above, if the nulls occur at multiples of 2500 Hz, then the disturbance is located 10 km from the splitter. As used herein, a null comprises a substantial decrease in the energy at a particular frequency. It is not necessarily a complete absence of energy at that frequency. For example, curve 402 exhibits a substantial decrease in energy at radian frequencies ($\Omega_0$, $k_1\Omega_0$, $k_2\Omega_0$, . . . ), where the decrease is measured with respect to the overall envelope 403 of the spectrum.

Figure 6:
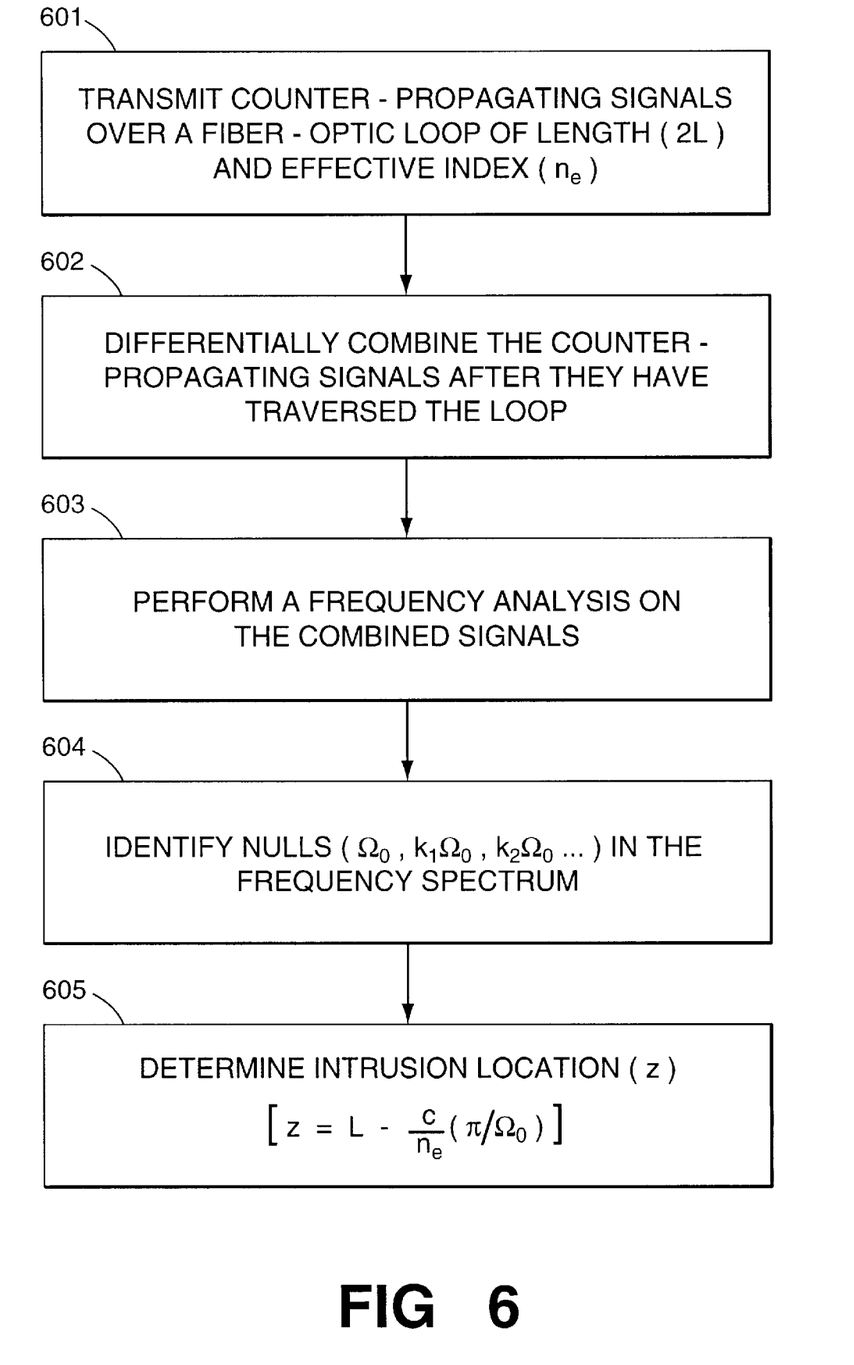
FIG. 6 discloses a method for determining the location of the disturbance according to the invention.

Reference is finally made to FIG. 6, which generally summarizes the steps that are performed in the practice of the invention. Steps 601 and 602 set forth the operation of known Sagnac interferometers wherein an optical signal is split into two subsignals, which are directed in counter-propagating directions around a common loop. After traversing the loop, the subsignals are combined in a detector to produce an interference pattern. The interference pattern is analyzed in steps 603, 604 and 605 using a processor 100 (see FIGS. 2 and 3). In particular, the frequency content of the interference pattern is determined in step 603 with particular attention directed to identification of harmonically related null frequencies ($\Omega_0$, $k_1\Omega_0$, $k_2\Omega_0$, . . . ) in step 604. Once $\Omega_0$ is identified, then the an intrusion location (z) can be determined in step 605 using the specific parameters of the system (i.e., loop length "2L," and the effective refractive index $n_e$ of the optical fiber in the wavelength region of the subsignals).

It should be understood and appreciated that the particular location-determining example set forth above represents a most basic implementation of the novel techniques of the present invention. However, if the Sagnac interferometer is established within a single cable, a localized distortion on that cable results in two positions in the loop being simultaneously effected. In such situations, each of the two positions effected by the distortion produce a set of harmonic frequencies that by themselves would have nulls in the frequency spectrum of the detected signal from the loop for the reasons discussed above.

Furthermore, some Sagnac interferometers can be configured such that the two locations affected result in the same set of harmonic frequencies, i.e. all of the nulls are aligned. Therefore, the methods described above can be employed to determine the location of the distortion or disturbance along the cable. In other configurations of Sagnac interferometers in a single cable, the harmonic frequencies will be different and thus their nulls not aligned, requiring more complicated techniques for analyzing the frequency spectrum to resolve the location of the distortion.

It is to be understood that the above-described arrangements are simply illustrative of the invention. Other arrangements may be devised by those skilled in the art which will embody the principles of the invention and fall within the scope thereof. For example, the sensitivity of the detection systems of the type set forth above can be changed by the modulation rate of the source which changes the spectral characteristics of the pulses and in so doing can exaggerate the constructive and destructive interference. Also, change in the splitting ratio of the four port splitter as indicated earlier on herein can be used.

I claim:

1. An optical fiber sensing system which comprises:
   a source, which produces an optical signal;
   an optical splitter, which receives and splits the optical signal into a pair of subsignals, the splitter also being effective to recombine the pair of subsignals after the subsignals have traveled in opposite directions around a common path, said recombined subsignals having a frequency spectrum;
   an optical fiber path, which begins and ends at the optical splitter and which provides the common path; and
   a detection system, which receives at least a portion of the recombined subsignals and performs a spectral analysis thereon in order to identify frequencies associated with harmonically related nulls in the spectrum.

2. The optical fiber sensing system of claim 1, wherein the detection system is effective to determine the location along the optical fiber path at which a disturbance is generated according to the formula:

$$z = L - c/n_e(\pi/\Omega_0); \text{ where}$$

z is the distance between the locations of the disturbance and the splitter;
2L is the length of the common path;
c is the speed of light;
$n_e$ is the effective index of refraction of the optical fiber path experienced by the subsignals; and
$\Omega_0$ is the fundamental frequency associated with harmonically related nulls in the spectrum.

3. The optical fiber sensing system of claim 1, wherein the source comprises a coherent light source.

4. The optical fiber sensing system of claim 3, wherein the source comprises a laser.

5. The optical fiber sensing system of claim 1, wherein the optical fiber path comprises optical fibers that are disposed in a cable.

6. The optical fiber sensing system of claim 4, wherein the optical fibers that comprise the optical fiber path are dedicated to the optical fiber sensing system.

7. The optical fiber sensing system of claim 4, wherein the optical fibers that comprise the optical fiber path also transmit optical communication signals which differ in wavelength from the wavelengths of the subsignals.

8. The optical fiber sensing system of claim 7, wherein the optical fiber path includes optical routers that route wavelengths associated with the sensing system onto one path and route wavelengths associated with the communication signals onto another path.

9. The optical fiber sensing system of claim 8, wherein the optical routers comprise wavelength-division multiplexers.

10. An optical fiber communication system comprising a receiving portion and a transmitting portion capable of propagating optical signals therebetween and a sensing system which comprises:

a first optical fiber, which carries optical signals in one or more first wavelength regions;

a second optical fiber, which carries optical signals in one or more second wavelength regions;

a pair of wavelength division multiplexers, which are spaced along the first optical fiber;

a pair of wavelength division multiplexers which are spaced along the second optical fiber;

a source of optical power which is adapted to provide optical signals in a wavelength region other than the first and second wavelength regions;

an optical splitter, which is connected to one of the wavelength division multiplexers along the first optical fiber, to one of the wavelength division multiplexers along the second optical fiber, and to the source of optical power, said optical splitter being adapted to split the optical signals from the source of optical power into two subsignals;

an optical path connecting the wavelength division multiplexer along the first optical fiber to the wavelength division multiplexer along the second optical fiber in a manner that completes an optical loop, said loop providing a common path for the subsignals to be transmitted in opposite directions around the loop and returned to the optical splitter, which is adapted to recombine the subsignals after they have traversed the loop in opposite directions, said recombined subsignals having a frequency spectrum; and a detection system, which is connected to the optical splitter and which receives at least a portion of the recombined subsignals and performs a spectral analysis thereon to identify frequencies associated with harmonically related nulls in the spectrum.

11. The optical fiber communication system of claim 10, wherein the detection system is effective to determine the location along the optical path at which a disturbance is generated according to the formula:

$$z = L - c/n_e(\pi/\Omega_0); \text{ where}$$

z is the distance between the locations of the disturbance and the splitter;
2L is the length of the common path;
c is the speed of light;
$n_e$ is the effective index of refraction of the optical path experienced by the subsignals; and
$\Omega_0$ is the fundamental frequency associated with harmonically related nulls in the spectrum.

12. The optical fiber communication system of claim 10, wherein the source of optical power comprises a coherent light source.

13. A method of sensing disturbances along an optical fiber system, the method comprising the steps of:

introducing an optical signal into the system at a designated entry point;

splitting the optical signal into two subsignals;

directing the two subsignals in opposite directions around a common loop path and returning the two subsignals to the entry point of the path;

recombining the two subsignals after they have traveled around the common path and returned to the entry point to form an interference signal, which has an associated frequency spectrum; and performing a spectral analysis on the interference signal to identify frequencies associated with harmonically related nulls in its frequency spectrum.

14. The method of claim 13, further including the step of:

determining the location of a disturbance according to the formula:

$$z = L - c/n_e(\pi/\Omega_0); \text{ where}$$

z is the distance between the locations of the disturbance and the splitter;
2L is the length of the common path;
c is the speed of light;
$n_e$ is the effective index of refraction of the optical fiber path experienced by the subsignals; and
$\Omega_0$ is the fundamental frequency associated with harmonically related nulls in the spectrum.

15. The method of claim 13, wherein the step of directing the two subsignals in opposite directions around a common loop path and returning the two subsignals to the entry point of the path is accomplished using optical fibers that are located within a single cable.

16. The method of claim 13, wherein the step of directing the two subsignals in opposite directions around a common loop path and returning the two subsignals to the entry point of the path is accomplished using optical fibers that are located within two different cables.

17. The method of claim 13, wherein the step of directing the two subsignals in opposite directions around a common loop path and returning the two subsignals to the entry point of the path is accomplished using optical fibers that are simultaneously transmitting optical signals at wavelengths other than the wavelengths of the subsignals.

* * * * *